United States Patent [19]
Jones

[11] 3,817,348
[45] June 18, 1974

[54] REFUELING BRIDGE WITH SERVICE ELEVATOR FOR WELL WALL MAINTENANCE

[75] Inventor: Cecil Roy Jones, Orange, Conn.

[73] Assignee: Transfer Systems Incorporated, North Haven, Conn.

[22] Filed: July 10, 1972

[21] Appl. No.: 270,232

[52] U.S. Cl................ 182/142, 182/37, 182/223, 15/56, 15/246.5
[51] Int. Cl.............................................. E04g 3/00
[58] Field of Search........... 182/128, 129, 142, 131, 182/36, 37, 223; 15/56, 246.5, 104.1 C

[56] References Cited
UNITED STATES PATENTS

| | | | |
|---|---|---|---|
| 1,901,647 | 3/1933 | Howald | 15/21 R |
| 2,710,418 | 6/1955 | Putnam | 182/128 |
| 3,023,831 | 3/1962 | Bevis | 182/131 |
| 3,487,841 | 1/1970 | Goodrum | 15/56 |

*Primary Examiner*—Reinaldo P. Machado

[57] ABSTRACT

An improved refueling bridge superstructure comprising a service elevator for personnel access to the reactor well of a nuclear reactor is described. The service elevator is provided with end extensions laterally movable relative to its personnel platform, and power driven brushes are mounted on the end extensions such that they can be brought into cleaning engagement with the walls during a wall cleaning, decontamination, maintenance procedure.

9 Claims, 5 Drawing Figures

REFUELING BRIDGE WITH SERVICE ELEVATOR FOR WELL WALL MAINTENANCE

This invention relates to an improved refueling bridge useful for carrying out certain maintenance operations for nuclear reactors.

In my copending application Ser. No. 133,687, filed Apr. 13, 1971 and now U.S. Pat. No. 3,744,593, I describe a novel refueling bridge superstructure for a conventional power generating nuclear reactor of the type comprising a sealed reactor pressure vessel housed in a reactor well as part of a containment structure. Frequently the reactor well communicates with adjoining fuel and equipment storage wells. The refueling bridge extends over the reactor and adjoining wells and is movable with respect thereto, usually along parallel rails mounted on the refueling floor. On the refueling bridge is a personnel platform or walkway and overhead various hoist mechanisms and grapples which can be lowered into the wells for removing equipment. The grapples are used to redistribute or replace the nuclear fuel elements in the open reactor vessel, as is well-known in the art. The novel refueling bridge described in my copending application features an attached service elevator platform having a length approximately equal to the diameter of the reactor pressure vessel and capable of being lowered into the reactor well. Personnel positioned on the service platform thus have access to various parts of the pressure vessel and reactor therein for carrying out required repair, maintenance or service work on the reactor installation.

One of the serious problems that has confronted the nuclear power industry is radioactive contamination of the shielding fluid, usually water, which fills the wells and surrounds the reactor vessel. During operation, leaks frequently occur in the fuel element structures causing discharge of radioactive material into the reactor coolant or the shielding pool water during transfer or storage of the leaking elements. Decontamination of the pool water thus becomes necessary. In addition, the contaminated pool water can contaminate the walls of the reactor well. From time to time, the pool water is removed or its level lowered and the well walls scrubbed with brushes and suitable cleansing agents to remove or reduce the degree of wall contamination. This is presently carried out by personnel climbing down ladders lowered into the reactor well, and hand-scrubbing the walls. This procedure is cumbersome, time-consuming, and quite inefficient.

The main object of the invention is a modified service platform attachment for a refuelling bridge generally of the type described in my copending application and capable of assisting personnel to carry out a reactor well wall cleaning operation in a more efficient manner.

This and further objects and advantages of my invention as will appear hereinafter are achieved, in accordance with my invention, by adding to the access elevator service platform end extensions for personnel and capable of lateral movement relative to the service platform toward and away from the well walls. As a further feature, a rotatable and pivotable scrubbing brush is mounted on the platform end extensions such that it can be brought into cleaning engagement with the well walls. The brush may be supplied with clean water and is motor driven to enable rapid and efficient scrubbing of the well walls. In this construction, which constitutes a relatively inexpensive addition to the elevator service platform of my earlier invention, a substantial fraction of the well walls are accessible and can be scrubbed clean by means of the motor-driven brushes. The remaining relatively small fraction of wall interiors not accessible in this manner may be cleaned in the usual way.

The invention will now be described in greater detail with reference to the accompanying drawings wherein.

As is described in my prior copending application Ser. No. 133,687, conventional boiling water or pressurized water reactor installations include within a containment structure comprising a reinforced concrete base a series of adjacent wells. A typical installation would include for instance a center cylindrical well housing a reactor pressure vessel and communicating when desired via wall channels with oppositely adjoining auxiliary wells, all extending downward from a common refueling floor. In operation, all three wells are filled with shielding water. One auxiliary well, the fuel pool, is typically used for storing reactor fuel elements, and the other for storing fuel handling equipment. Hoist mechanisms are required for handling the fuel elements. Typically, these are consolidated in a refuelling bridge superstructure which is mounted for movement over the three wells on rails on the refueling floor. My copending application shows and describes one such typical structure, and also illustrates the improvement obtained by adding to the bridge superstructure a service or access elevator platform having a length approximately the diameter of the reactor vessel, and which could be lowered into the reactor well in order that personnel stationed on the service platform could more efficiently carry out certain maintenance procedures on the reactor. As previously mentioned, from time to time personnel are also required to lower the contamination level of the well walls, and this is accomplished, after lowering of the water level in the reactor and equipment wells, by scrubbing the well walls with hand brushes from ladders extending down into the well. While the service elevator platform of the earlier case also enabled personnel to be lowered into the well, the construction was such as not to permit ready access by personnel on the platform to the walls for a scrubbing operation.

Figure 1:
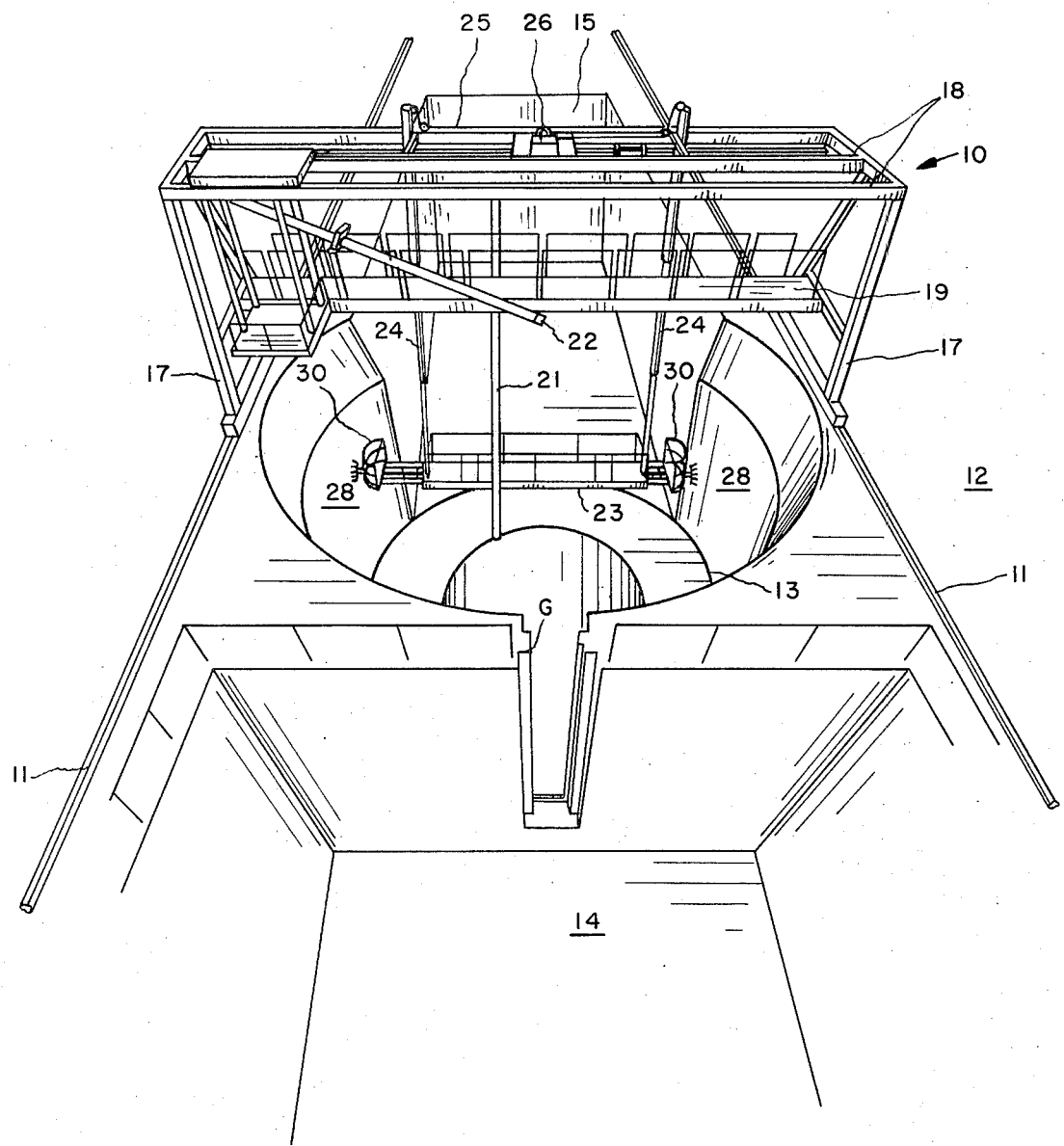
FIG. 1 is a perspective view of one form of the refueling bridge superstructure of the invention mounted on the refueling floor of a typical reactor installation.

The present invention provides a modified service platform construction enabling achievement of the foregoing. Referring now to the drawings, FIG. 1 illustrates the refueling bridge superstructure substantially depicted in my prior application but with one form of the service platform modification of the present invention. As shown, the refueling bridge superstructure is generally designated 10 and extends over the aforedescribed wells on rails 11 on the refueling floor 12. The reactor well is designated 13 (the pressure vessel is omitted for clarity), and the auxiliary wells are designated 14 and 15. The refuelling bridge 10 comprises two end supports 17, generally in the form of A-frames supporting an overhead structure 18 and an underlying walkway 19 which spans the reactor well 13. The bridge 10 under operator control can be driven along the parallel rails 11 mounted on the refueling floor. An equipment grapple 21 is supported for up and down motion from the overhead structure and lateral motion therealong, and a fuel element grapple 22, shown in its stored position, is capable under operator control of performing similar up and down and lateral movements. The service access platform described in my earlier case is designated 23. It is supported by telescoping tubes 24 driven by cables 25 from a suitable hoist mechanism 26 and thus under operator control can be raised and lowered within the reactor well 13. While the reactor itself has been omitted for clarity, the length of the service access platform as described in my earlier case is approximately equal to the diameter of the reactor vessel. From this platform personnel do not have ready access to the walls 28 of the reactor well and thus will not be enabled to carry out a wall cleaning operation thereon, or other wall maintenance operation.

Figure 2:
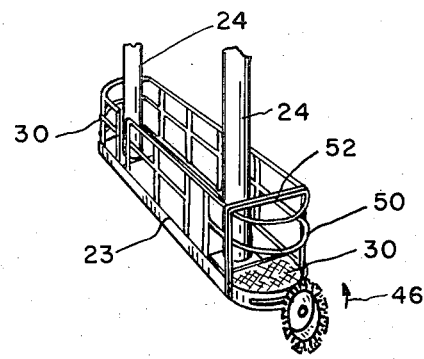
FIG. 2 is a perspective view of the service platform with a retracted end extension.
Figure 3:
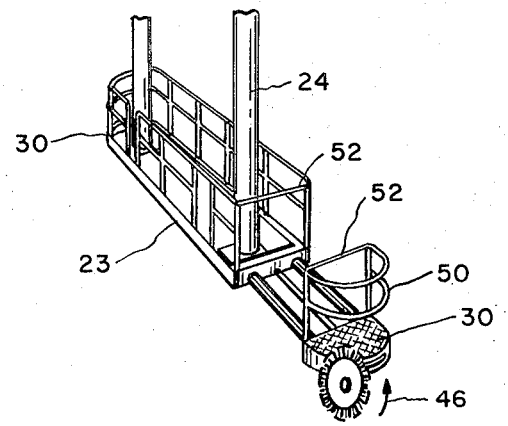
FIG. 3 is a perspective view similar to FIG. 2 with an extended end extension.
Figure 5:
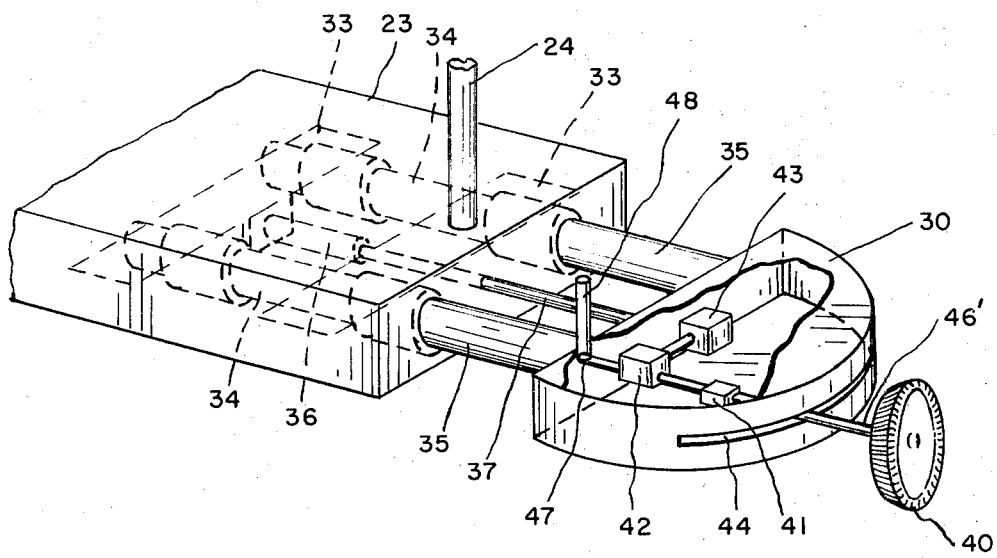
FIG. 5 is a perspective view of one end of the service platform and end extension with the railings removed for clarity.

In accordance with the invention, end extensions 30 are added to each end of the service platform 23. As indicated in FIGS. 2 and 3, the end extensions are laterally movable under operator control from a retracted position shown in FIG. 2, to an extended position shown in FIG. 3. The end extensions 30 can be mounted in any suitable manner for carrying out the desired motion. One exemplary construction is illustrated in FIG. 5. Secured within the bottom of the main platform 23 are fixed braces 33, which in turn support a telescoping tube support structure comprising fixed tubes 34 and movable tubes 35. The latter in turn are secured by way of a brace to the movable end extension 30. A conventional air cylinder 36 is also mounted and secured to the fixed brace, and its piston 37 is secured to the brace of the movable end extension 30. Thus, under control of the operator, the end extensions can each be pneumatically moved laterally to any position desired.

Figure 4:
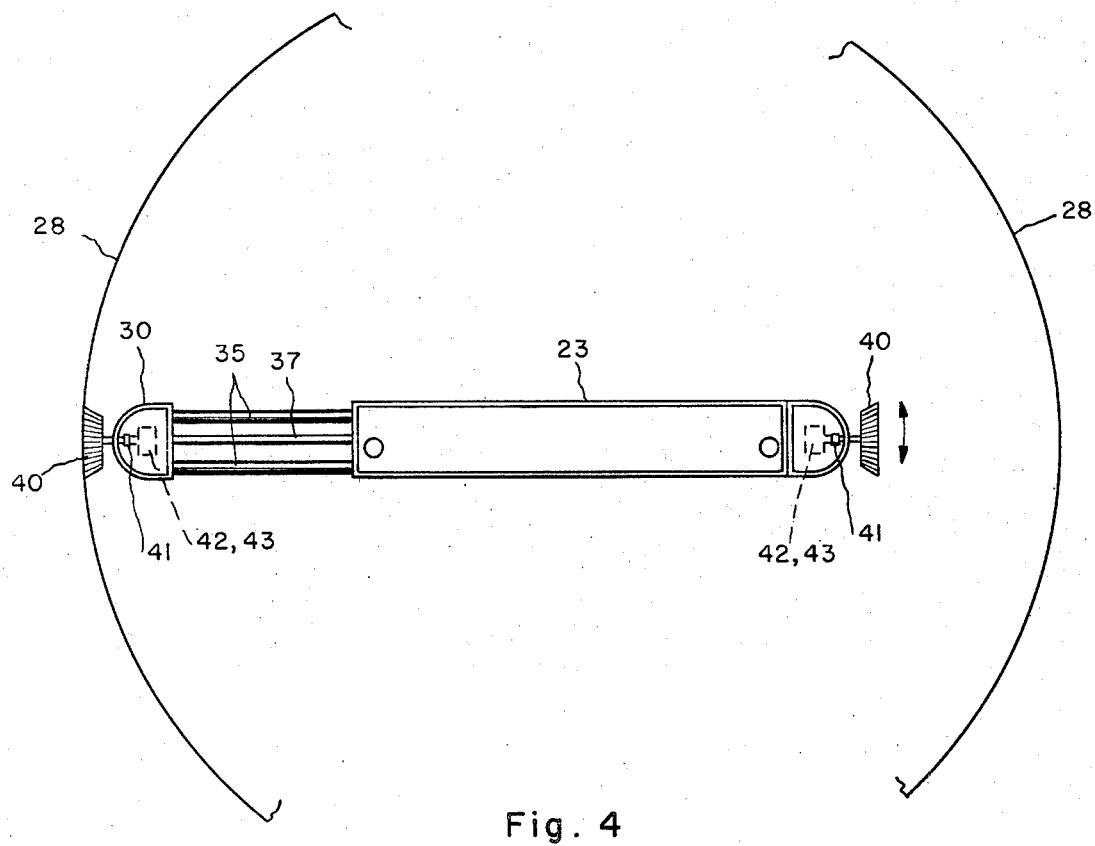
FIG. 4 is a plan view of just the service platform within the reactor well.

As shown more clearly in FIGS. 4 and 5, each end extension 30 is provided with a cleaning brush 40 mounted in the floor of the extension 30. The brush has a cleaning head extending in a vertical plane and its shaft is coupled via a pivotable joint 41 to a suitable gear box 42 and motor 43, also mounted in the extension floor. The pivotable joint 41 allows the brush 40, as shown by the arrows in FIG. 4 to move via a slot 44 in the extension over an arc of about 90°–135° to enable the brush 40 to be brought into cleaning engagement with well wall portions inclined at various angles. The pivotable joint 41, which is commercially available, also allows the motor to rotate the brush as shown by the arrow designated 46 when fixed or while being pivoted. The angular position of the brush 40 may be manually controlled by the operator.

The brush 40 is preferably mounted on a hollow shaft 46', which also extends through the pivotable joint 41 and through the gear box 42 and terminates in a coupling 47 for attachment to a suitable conduit 48 (shown only in FIG. 5) connected to a supply of fresh or detergent water which under operator control can be supplied to the brush during the wall scrubbing operation.

The operator stands on the extension platform protected by suitable railings 50 while the extension 30 under his control can be moved out to the walls 28 and the wall scrubbing operation carried out. The operator can also control the vertical position of the access elevator main platform 23 and also the position of the bridge 10, using a control box or pendant, not shown, of conventional construction, to enable access to most of the reactor well interior walls. Any wall portions not directly accessible from the end extensions, due to their restricted width, may be scrubbed by hand in the normal manner. Access for personnel to the end extensions may be had via the main service platform 23 by making the rear railings 52 removable.

Other constructions within the principles enunciated above will be evident to those skilled in this art. For example, the brushes may be mounted in different ways on the end extensions, or power driven in a different manner than that illustrated. Similarly, the fresh water supply may be omitted if desired. Also, other cleaning or maintenance implements can also be mounted on the end extensions as a substitute for or in addition to the brushes. For example, instead of using brushes, the end extensions can be provided with high-pressure spray apparatus for spraying water or other cleansing agents at a presure of say 1,500 psi onto the wall for a cleaning and decontamination operation. In addition, the end extensions are also useful to afford personnel access to the walls of the reactor and equipment wells for maintenance operations other than wall cleaning operations.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A refueling bridge for a reactor well with a reactor pressure vessel in the reactor well comprising:
    a. a superstructure extending across the reactor well and supported by surfaces adjacent to the reactor well;
    b. a service platform having a length enabling it to fit within the well supported on the superstructure;
    c. means for controllably raising and lowering said service platform relative to the superstructure; said service platform being constructed to support personnel to provide access by said personnel to the well interior;
    d. end extensions mounted on the service platform;
    e. and means for controllably moving laterally the end extensions relative to the service platform.

2. A refueling bridge as claimed in claim 1 wherein the end extensions comprise a platform sized to support personnel.

3. A refueling bridge as claimed in claim 2 wherein wall cleaning means are mounted on the end extensions for lateral movement therewith.

4. A refueling bridge as claimed in claim 3, wherein the wall cleaning means comprises power-driven brushes mounted on the end extensions and projecting laterally away from the extensions.

5. A refueling bridge as claimed in claim 4, wherein the brushes are pivotably mounted on the end extensions for radial movement relative thereto.

6. A refueling bridge as claimed in claim 5, wherein the brushes are mounted at the bottom of the end extensions.

7. A refueling bridge as claimed in claim 6, wherein means are provided for supplying fresh water to the brushes.

8. Apparatus for providing access to equipment and parts of a nuclear reactor well sunk below a floor level and containing within the well a reactor pressure vessel, comprising a bridge superstructure having uprights supported on the floor level at opposite sides of the reactor well and upright connecting means extending over and across the reactor well, means for moving the bridge superstructure along the floor in a horizontal direction relative to the reactor well, an elongated platform for personnel having a length enabling it to fit within the reactor well, means connected to the platform for supporting same on the upright connecting means of the superstructure, means for moving the platform upward and downward relative to the superstructure and down into the reactor well to enable personnel on the platform to have access to the reactor well, a walkway extending across the bridge superstructure, platform extensions mounted at opposite ends of the platform, said extensions being sized to support personnel, means for laterally moving the extensions toward and away from the reactor well walls, and well wall maintenance implements mounted on the end extensions for lateral movement therewith, whereby the well walls can be subjected to maintenance operations under the close supervision of personnel on the platform extensions.

9. Apparatus as claimed in claim 8 and further comprising a first railing substantially enclosing the platform, and separate railings substantially enclosing each of the platform extensions.

* * * * *